United States Patent Office 2,968,523
Patented Jan. 17, 1961

2,968,523

PREPARATION OF SODIUM-POTASSIUM BOROHYDRIDE

George L. Cunningham, John M. Bryant, and Emily M. Gause, San Antonio, Tex., assignors to Callery Chemical Company, Pittsburgh, Pa., a corporation of Pennsylvania No Drawing. Filed Sept. 21, 1954, Ser. No. 457,367

2 Claims. (Cl. 23—14)

This invention relates to the preparation of potassium borohydride and particularly to a process whereby sodium borohydride and potassium hydroxide are reacted in aqueous or alcoholic solutions to produce potassium borohydride and sodium hydroxide.

Potassium borohydride has been prepared in a variety of ways. One method involves the reaction of potassium tetramethoxyborate and diborane. In another method diborane is reacted with potassium hydroxide. A third method makes use of the reaction of potassium hydride with trimethyl borate. These methods are all circuitous and expensive because the starting materials are not readily available. Furthermore, these methods require the use of potassium metal which is considerably more expensive than sodium. Therefore, it would be highly desirable from an economic viewpoint to prepare potassium borohydride from sodium borohydride which is comparatively cheap and commercially available. This led to an extensive investigation of the possibility of replacing the sodium atom in sodium borohydride with potassium by simple metathesis with cheap potassium salts to produce potassium borohydride.

It is an object of this invention to provide a new and useful method for preparing potassium borohydride in substantially quantitative yield which is both simple and economical.

Another object is to provide a new method whereby sodium borohydride and potassium hydroxide are reacted in aqueous or alcoholic solutions to produce potassium borohydride by direct metathesis.

Other objects of this invention will become apparent from the specification and claims hereinafter related.

This new and economical process will be described more fully in the specification and the novelty thereof will be particularly pointed out and distinctly claimed.

This invention is based upon the discovery that potassium borohydride is relatively insoluble and chemically stable in aqueous or alcoholic solutions containing small amounts of alkali metal hydroxides. For example at 25° C. the solubility of potassium borohydride in pure water is relatively great but if 5% by weight of sodium or potassium hydroxide is added the solubility of potassium borohydride is very substantially decreased. In the case of an alcoholic solution the addition of about 1% by weight of hydroxide diminishes the solubility of the potassium borohydride but to a lesser degree. If the concentration of potassium hydroxide or sodium hydroxide is increased there is a further decrease in the solubility of potassium borohydride. Thus, if solid sodium borohydride is added to a relatively concentrated solution of potassium hydroxide in either water or alcohol a reaction will occur and the major proportions of the potassium ions will be precipitated as potassium borohydride.

We have found, however, that there are several factors limiting the application of this process. Sodium borohydride and potassium borohydride are rather soluble in pure water or alcohols. Thus, if the solution is dilute with respect to the alkali metal hydroxide there is no reaction since the potassium borohydride will remain in solution rather than precipitate. We have also found that due to the decreased solubility of potassium borohydride at lower temperatures, lower concentrations of the alkali metal hydroxide are necessary at lower temperatures to cause the precipitation of the potassium borohydride. Since aqueous or alcoholic solutions of alkali metal borohydrides tend to decrease in stability with increasing temperature it is not advisable to use temperatures in excess of 60° C. and preferably to use temperatures of about 25° C. in order to avoid excessive decomposition of the borohydride ion. The addition of hydroxide to alcoholic or aqueous borohydride solutions has been found to increase the stability throughout the range of temperatures investigated.

The viscosity of aqueous or alcoholic solutions of alkali metal hydroxides increases with an increase in the alkali metal hydroxide concentration. We have found that this increased viscosity makes the process more difficult to operate. As the alkali metal hydroxide concentration is lowered at any given temperature the solubility of potassium borohydride is increased and thus the amount of potassium borohydride which precipitates is decreased. It is therefore not advisable to use aqueous or alcoholic solutions containing less than about 5% by weight of alkali metal hydroxide.

When sodium borohydride is added to concentrated and viscous aqueous or alcoholic solutions of potassium hydroxide the rate of conversion to potassium borohydride is relatively slow. We have found that this rate can be substantially increased by the addition of an amine which does not take part in the reaction. These amines are useful in lowering the viscosity of the reacting solution and also lowering the solubility of potassium borohydride in the solvent which serves to increase the yield of potassium borohydride. One of the most satisfactory amines for this purpose is n-butylamine. The solubility of sodium borohydride in n-butylamine at 25° C. is about 4.9 g. per 100 g. of n-butylamine while the solubility of potassium borohydride at the same temperature is 0.08 g. per 100 g. of n-butylamine. The n-butylamine forms a top layer which remains throughout the conversion. The amount of amine required is about 5% or less of the volume of alkali metal hydroxide solution. Other liquids which we have found satisfactory for this purpose are monomethylamine, dimethylamine, trimethylamine, monoethylamine, diethylamine, triethylamine, isopropylamine, n-amylamine, liquid ammonia, ethylene glycol dimethyl ether, diethylene glycol dimethyl ether, triethylene glycol dimethyl ether and tetraethylene glycol dimethyl ether.

In our experiments we found that when equivalent amounts of sodium borohydride and potassium hydroxide are used in concentrated solutions of water or alcohol the amount of potassium borohydride formed is so large that there is considerable difficulty encountered in filtering and handling the thick slurries produced. This can be avoided in the case of aqueous solutions by adding sodium borohydride, either as a solid or in solution, in small increments to a concentrated aqueous solution of potassium hydroxide and filtering out the potassium borohydride formed before the next increment is added. For example, an aqueous solution of potassium hydroxide which is substantially saturated is added to a solution of sodium borohydride in n-butylamine, the amount of sodium borohydride being only a fraction of the amount required to react with all of the potassium hydroxide. The system will form two liquid layers. The upper layer will be mostly n-butylamine containing a small amount of sodium and potassium borohydride. The lower layers will be mostly water containing sodium and potassium hydroxide plus a small amount of alkali metal borohydride. Practically all of the borohydride ions present in the mixture will be precipitated as potassium borohydride. The slurry is filtered to remove potassium borohydride and give a filtrate of the two liquid layers. Additional amounts of sodium borohydride are then added to the filtrate and the procedure repeated until the total amount of sodium borohydride added is equal in mols to the mols of potassium hydroxide in the original aqueous solution. Since potassium borohydride is relatively insoluble in methyl alcohol containing about 1% potassium hydroxide by weight the wet cake of potassium borohydride can be washed with this solution without undue loss of product and with a minimum of decomposition. Furthermore, the small amount of potassium hydroxide left on the wet potassium borohydride crystals after the washing operation aids in stabilizing the final product during the vacuum drying operation.

If lower concentrations of potassium hydroxide are used it is not necessary to use the step-wise process described above. However, since the solubility of potassium borohydride increases with a decrease in the alkali metal hydroxide concentration, the percentage yield will be lower. If substantially pure potassium borohydride is to be produced in concentrated alkali metal hydroxide solutions in alcohol it has been found that molar ratios of sodium borohydride to potassium hydroxide of not less than 1:2 must be used. If the molar proportion of the potassium hydroxide is increased above the aforementioned ratio a double salt of potassium borohydride and sodium borohydride containing one mol of each salt is formed rather than pure potassium borohydride.

In one experiment, 9.6 g. of sodium borohydride were added to 36.6 g. of potassium hydroxide dissolved in 175 g. of methyl alcohol. The slurry was stirred for four hours at 25° C. and filtered to obtain 14.6 g. of the double salt of potassium borohydride and sodium borohydride. The composition of this salt was established by a Schreinemaker's test. In this test, several slurry compositions of sodium borohydride and potassium hydroxide in methanol were made up and allowed to come to equilibrium. The composition of each slurry and the compositions of the corresponding liquid phase and wet solid in equilibrium with the liquid were then determined. These data were plotted as equivalent fractions on a rectangular graph in which the abscissa measures the amount of sodium or potassium and the ordinate the amount of hydroxide or borohydride. It was found that lines drawn through the several points in each set of data all focused on a single point corresponding to the composition of the double-salt $NaBH_4 \cdot KBH_4$. This salt is a stable solid but separates into its components when dissolved in water. The yield was 99.7% of theory. The liquid phase consisted of methyl alcohol containing 29.5 g. of potassium hydroxide, 5.1 g. of sodium hydroxide and 0.3 g. of potassium borohydride in solution.

In another experiment, 9.0 g. of sodium borohydride were added to 13.3 g. of potassium hydroxide dissolved in 139 g. of methyl alcohol. The slurry was stirred for four hours at 25 C. and filtered to obtain 12.6 g. of potassium borohydride which is a yield of 98.3%. The wet potassium borohydride crystals were washed with methyl alcohol containing 1% potassium hydroxide by weight and dried under a vacuum. A product containing 98% potassium borohydride was obtained. The filtrate consisted of methyl alcohol containing 9.5 g. of sodium hydroxide, and 0.23 g. of potassium borohydride in solution.

In still another experiment, 9.9 g. of sodium borohydride and 14.8 g. of potassium hydroxide were added to a solution of 66.8 g. methyl alcohol and 66.8 g. of n-butylamine. The slurry was stirred for four hours at 25° C. and filtered to obtain 13.9 g. of potassium borohydride which is 98.8% of theory. After washing the wet crystal with a 1% solution of potassium hydroxide in methyl alcohol and drying under a vacuum, the product contained 99% potassium borohydride. The filtrate consisting of methyl alcohol and n-butylamine contained 10.5 g. of sodium hydroxide, and 0.17 g. of potassium borohydride in solution.

Further experiments showed that other lower alcohols such as ethyl, propyl, butyl and amyl can be substituted for the methyl alcohol in this process with similar results.

Potassium borohydride was also prepared in aqueous solution using the following procedure: 37.8 g. of sodium borohydride was added to a solution of 56.1 g. of potassium hydroxide in 224 g. of water. The slurry was stirred for 24 hours at 25° C. and filtered to obtain 14.8 g. of potassium borohydride. The wet crystals were washed with a methyl alcohol solution containing 1% potassium hydroxide by weight. The washed crystals were dried under a vacuum at room temperature to give a product containing 98% potassium borohydride. The yield was 27.8% since a dilute solution (i.e. 20%) of potassium hydroxide was used. The filtrate consisted of an aqueous solution containing 40 g. of sodium hydroxide and 39 g. of potassium borohydride.

In a similar experiment, the yield of potassium borohydride was increased by using n-butylamine as follows: 9.1 g. of sodium borohydride and 13.5 g. of potassium hydroxide were added to a solution of 54.2 g. of water and 40 g. of n-butylamine. The slurry was filtered to remove 7.6 g. of potassium borohydride which was washed with methyl alcohol containing 1% sodium hydroxide by weight. After vacuum drying at room temperature, a product containing 95% potassium borohydride was obtained. The yield was 67.6%. The aqueous filtrate contained 8.4 g. of sodium hydroxide, 1.7 g. of potassium hydroxide, 3.6 g. of potassium borohydride plus water and n-butylamine.

In a third experiment using a step-wise procedure, the yield of potassium borohydride was further increased as follows: 4.3 g. of sodium borohydride dissolved in 107 g. of n-butylamine were added to a solution of 30 g. of potassium hydroxide dissolved in 30 g. of water. The slurry was stirred for four hours and filtered to obtain 1.7 g. of potassium borohydride. Another portion of sodium borohydride was then added, the slurry filtered and the potassium borohydride formed was recovered. This process was repeated until the total number of mols of sodium borohydride added were equivalent to the potassium hydroxide originally present. The final yield was 95% of theory.

Potassium borohydride was also prepared in the following manner: 5.6 g. of sodium borohydride and 42 g. of potassium hydroxide were added to a solution of 58 g. of water and 101 g. of tetraethylene glycol dimethyl ether. The slurry was stirred four hours and filtered to obtain 1.5 g. of potassium borohydride. To the aqueous filtrate was added another portion of sodium borohydride and the operation repeated until the total mols of sodium borohydride added was equal to the mols of potassium hydroxide present in the original solution. The wet filter cake was washed with methyl alcohol containing 1% potassium hydroxide and dried under a vacuum to produce a product containing 95.6% potassium borohydride. The yield was 37.5 g. or 93% of theory.

While several embodiments of this invention have been described it is to be understood that within the scope of the claims appended hereto this invention may be practiced otherwise than as specifically described.

Having thus described our invention in conformity with the patent laws what is desired to be claimed and secured by Letters Patent of the United States is:

1. A method of preparing the double borohydride salt of sodium and potassium ($NaBH_4 \cdot KBH_4$) which comprises adding sodium borohydride to an alcoholic solution of potassium hydroxide in a molar ratio of hydroxide to borohydride of more than 2:1 and recovering the double salt $NaBH_4 \cdot KBH_4$ which precipitates.

2. A new composition of matter, the double salt $NaBH_4 \cdot KBH_4$.

References Cited in the file of this patent

UNITED STATES PATENTS 2,741,540   Bragdon _____ Apr. 10, 1956

OTHER REFERENCES

S. W. Chaikin et al.: "Journal of the American Chemical Society," vol. 71, pp. 122–5, January 1949.

Hurd: "Chemistry of the Hydrides," 1952, p. 160.

Schechter et al.: "Boron Hydrides and Related Compounds," Callery Chemical Co., March 1951, Department of the Navy, Bureau of Aeronautics, declassified, p 52.

Banus et al.: "Journal of the American Chemical Society," vol. 76, page 3848 (1954), paper received Feb. 17, 1954.